United States Patent
Van Beek et al.

(10) Patent No.: US 8,331,714 B2
(45) Date of Patent: Dec. 11, 2012

(54) METHODS AND SYSTEMS FOR IMAGE PROCESSING

(75) Inventors: Petrus J. L. Van Beek, Camas, WA (US); Junlan Yang, Chicago, IL (US)

(73) Assignee: Sharp Laboratories of America, Inc., Camas, WA (US)

( * ) Notice: Subject to any disclaimer, the term of this patent is extended or adjusted under 35 U.S.C. 154(b) by 932 days.

(21) Appl. No.: 12/390,855

(22) Filed: Feb. 23, 2009

(65) Prior Publication Data

US 2010/0215282 A1   Aug. 26, 2010

(51) Int. Cl.
*G06K 9/40* (2006.01)
*G06K 9/36* (2006.01)

(52) U.S. Cl. ............................. 382/255; 382/284

(58) Field of Classification Search .................. 382/255, 382/254, 261, 263, 264, 284
See application file for complete search history.

(56) References Cited

U.S. PATENT DOCUMENTS

| | | | |
|---|---|---|---|
| 6,470,097 | B1 | 10/2002 | Lai et al. |
| 7,477,802 | B2 * | 1/2009 | Milanfar et al. ............. 382/299 |
| 7,561,186 | B2 * | 7/2009 | Poon ........................ 348/208.99 |
| 2007/0217713 | A1 | 9/2007 | Milanfar et al. |
| 2008/0137978 | A1 | 6/2008 | Fu |
| 2008/0253678 | A1 | 10/2008 | Li et al. |
| 2010/0165206 | A1 * | 7/2010 | Nestares et al. ............. 348/607 |

FOREIGN PATENT DOCUMENTS

WO   WO 2005/122086 A2   12/2005
WO   WO 2005/122086 A3   12/2005

OTHER PUBLICATIONS

Brox, Kleinschmidt and Cremers, "Efficient Nonlocal Means for Denoising of Textural Patterns," IEEE Transactions on Image Processing, Jul. 2008, pp. 1083-1092, vol. 17, No. 7, IEEE, USA.
Buades, Coll and Morel, "A non-local algorithm for image denoising," Proceedings of the IEEE International Conference on Computer Vision and Pattern Recognition, CVPR, Jun. 20-25, 2005, pp. 60-65, vol. 2, IEEE, USA.
Ng, Shen, Lam and Zhang, "A Total Variation Regularization Based Super-Resolution Reconstruction Algorithm for Digital Video," EURASIP Journal on Advances in Signal Processing, 2007, vol. 2007, Article ID 74585, 16 pages.
Gevrekci and Gunturk, "Superresolution under Photometric Diversity of Images," EURASIP Journal on Advances in Signal Processing, 2007, vol. 2007, Article ID 36076, 12 pages.
Gunturk and Gevrekci, "High-Resolution Image Reconstruction From Multiple Differently Exposed Images," IEEE Signal Processing Letters, Apr. 2006, pp. 197-200, vol. 13, No. 4, IEEE, USA.
Yamamoto, Nakai, Ueda and Shigeyama, "High-Resolution and High Dynamic Range Image Reconstruction From Differently Exposed Images With Piezo-Controlled Camera," ASME Proceedings of 2008 International Symposium on Flexible Automation, Jun. 23-26, 2008, Atlanta, GA, USA.

* cited by examiner

*Primary Examiner* — Yon Couso
(74) *Attorney, Agent, or Firm* — Kristine Elizabeth Matthews; David C. Ripma

(57) ABSTRACT

Aspects of the present invention are related to systems and methods for image processing, in particular, de-noising and de-blurring.

30 Claims, 6 Drawing Sheets

METHODS AND SYSTEMS FOR IMAGE PROCESSING

FIELD OF THE INVENTION

Embodiments of the present invention comprise methods and systems for image processing, in particular, noise removal and blur removal.

SUMMARY

Some embodiments of the present invention comprise methods and systems for iteratively estimating a jointly de-noised and de-blurred image from an input image. Exemplary embodiments comprise computation of non-local weights using a current image estimate and generating a new image estimate using the non-local weights, the current estimate and the input image. In some embodiments, a high-resolution image may be estimated from an input image comprising a combination of low-resolution images.

Some embodiments of the present invention comprise methods and systems for image de-noising using non-local weights. In some embodiments, a high-resolution image may be estimated from an input image comprising a combination of low-resolution images.

Some embodiments of the present invention comprise methods and systems for iterative image de-noising using non-local weights. In some embodiments, a high-resolution image may be estimated from an input image comprising a combination of low-resolution images.

Some embodiments of the present invention comprise methods and systems for iterative image de-blurring using local constraints.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Throughout the following description, an image may be denoted using matrix/vector notion, for example, X, or equivalently as a 2-dimensional (2-D) discrete array of pixel values, for example, X (i, j) or X. An operator may be denoted using matrix/vector notation, for example, H, or equivalently as a 2-D operator, for example, a filter, denoted H (i, j). Convolution may be denoted *.

Some embodiments of the present invention comprise methods and systems for constructing a high-resolution image from one or more low-resolution images. A low-resolution image may be captured by a camera or sensor system with a limited, or lower than desired, spatial resolution. A low-resolution image may be subject to one or more types of degradation inherent in the image-capture process by which the low-resolution image may be obtained. Exemplary types of image degradation may comprise blurring, noise and non-linearities. Blurring may involve suppression of high-frequency detail in the low-resolution image, and blurring may be due to camera optics, the imaging sensor and other factors. Noise may be a form of random signal variation that may be caused by the imaging sensor, by the system electronics, by analog-to-digital conversion and other factors. Exemplary nonlinearities may include saturation and other factors.

Figure 1:
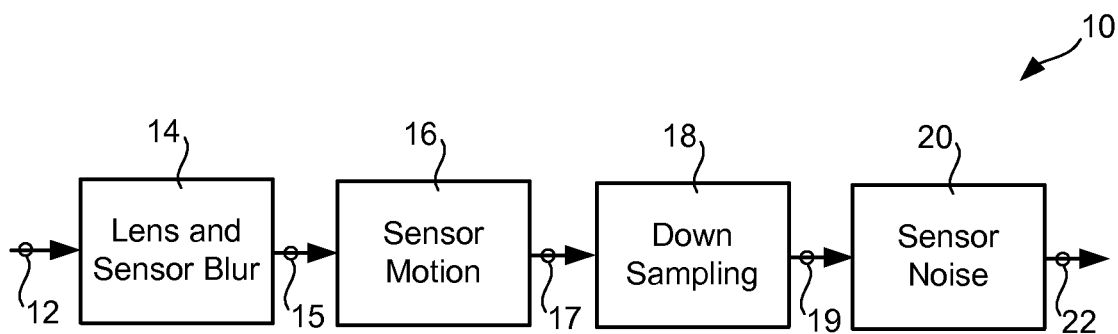
FIG. 1 is a picture depicting an exemplary image-capture model.

FIG. 1 depicts an exemplary capture-process model 10 for an ith low-resolution image capture. An ideal, high-resolution image 12, which may be denoted X, associated with a scene may be degraded 14 by lens and sensor blur, which may be represented by a combined point-spread-function, denoted $H_{PSF}$. The degraded image 15 may be subject to sensor motion degradation 16, which may be denoted $M_i$. The resulting degraded image 17 may be down sampled 18, and the down-sampling operator may be denoted $D_i$. Additive noise, which may be denoted $V_i$, present in the ith captured low-resolution image 22 may be added 20 to the down-sampled image 19. The model illustrated in FIG. 1 may be described by:

$$Y_i = D_i M_i H_{PSF} X + V_i,$$

where the ith captured low-resolution image 22 may be denoted $Y_i$.

In some embodiments of the present invention, the down-sampling operation and sensor motion may be known. In these embodiments, the effect of the known down-sampling operation and sensor motion may be undone by combining the observed, low-resolution images into a single, re-sampled image, which may be denoted $Y_{resampled}$, according to:

$$Y_{resampled} = \sum_{i=1,\ldots,I} M_i^{-1} D_i^{-1} Y_i,$$
$$= H_{PSF} X + V,$$

where V may be the up-sampled, motion-compensated noise field, and $M_i^{-1}$ and $D_i^{-1}$ may denote the inverse sensor motion and down-sampling operations, respectively, associated with the ith capture. The re-sampled image, $Y_{resampled}$, may still be degraded by the camera blur, $H_{PSF}$, and the noise, V.

Some embodiments of the present invention comprise methods and systems for removing the effect of the blur described by $H_{PSF}$ from the re-sampled image, $Y_{resampled}$. An estimate, which may be denoted $\hat{X}$, of the ideal, high-resolution image may be computed by minimization of a cost function formulated as follows:

$$\hat{X} = \arg \min \Phi(X),$$

with $$\Phi(X) = \mu \|Y_{resampled} - H_{PSF} X\|^2 + \lambda C(X),$$

where C (X) may be a regularizing, also considered stabilizing, constraint.

In some embodiments of the present invention, iterative minimization methods may be used to iteratively compute estimates of X. In some of these embodiments, the steepest descent approach may be used to generate, at each iteration, a next estimate, $\hat{X}^{k+1}$, from a current estimate, $\hat{X}^k$, by updating the current estimate in the opposite direction of the gradient of the cost function. In some embodiments, the initial estimate, $\hat{X}^0$, may be based directly on the re-sampled image. In some of these embodiments, the initial estimate may be determined according to:

$$\hat{X}^0 = Y_{resampled}.$$

In some embodiments, when $\lambda=0$, the estimate of X may be the unconstrained least-squares (LS) solution. In some of these embodiments, an iterative minimization scheme may be given according to:

$$\hat{X}^{k+1} = \hat{X}^k - \beta[H_{PSF}^T(H_{PSF}\hat{X}^k - Y_{resampled})].$$

where β may be the step-size, or update weight. In some embodiments, the update weight, β, may be held constant. In alternative embodiments, an optimal value of the update weight, β, may be computed at each iteration. In some of these embodiments, the optimal value may be determined to minimize the cost function given the current steepest descent direction. Some embodiments of the present invention may comprise computation of improved descent directions according to a conjugate gradient minimization method. Alternative embodiments may use other minimization methods known in the art.

In some embodiments, when $\lambda>0$, the regularization constraint, C ($\hat{X}$), may be based on a linear high-pass filter combined with the $L_2$ norm according to the Tikhonov-Miller approach. In some embodiments, the linear high-pass filter may comprise a 2-dimensional (2-D) Laplacian filter, which may be denoted L. In these embodiments, the regularization constraint may be determined according to:

$$C(\hat{X}) = \|L\hat{X}\|^2.$$

Some embodiments may comprise an iterative minimization according to:

$$\hat{X}^{k+1} = \hat{X}^k - \beta[H_{PSF}^T(H_{PSF}\hat{X}^k - Y_{resampled})] - \beta\lambda L^T L\hat{X}^k$$

using the steepest descent approach, where β may be the step-size, or update weight. Some embodiments may comprise a discrete Laplacian filter which may comprise weighting of neighboring pixels in a small, local, spatial window.

The regularization constraint may be based on a Total Variation (TV) norm in alternative embodiments of the present invention. In some embodiments, the TV norm may be computed as the $L_1$ norm of the gradient magnitude. In these embodiments, the regularization constraint may be determined according to:

$$C(\hat{X}) = \|\Delta\hat{X}\|_1.$$

where an exemplary discrete version may be determined as follows:

$$C(X) = \sum_{i,j} D_{i,j}(X)$$

where (i, j) is a pixel location and $$D_{i,j}(X) \equiv \sqrt{\sum_{l,m \in S} [X(i,j) - X(i+l, j+m)]^2},$$

where S denotes a local neighborhood proximate to the pixel location.

In some embodiments, the local variation, $D_{i,j}$ (X), at a pixel location, (i, j), may be defined using a local neighborhood of the four connected neighboring pixels. In these embodiments, $S=\{(1,0), (0,1), (-1,0), (0,-1)\}$. In alternative embodiments, the local variation may be defined using a local neighborhood of the eight connected neighboring pixels. In yet alternative embodiments, other local neighborhoods may be used. Using steepest-descent-based minimization, some embodiments may comprise an iterative update according to:

$$\hat{X}^{k+1}(i,j) =$$
$$\hat{X}^k(i,j) - \beta[H_{PSF}^T(-i,-j) * (H_{PSF}(i,j) * \hat{X}^k(i,j) - Y_{resampled}(i,j))] -$$
$$0.5\beta\lambda \left[\sum_{l,m \in S} \alpha_{i,j,l,m}(\hat{X}^k)(\hat{X}^k(i,j) - \hat{X}^k(i+l, j+m))\right]$$

where * denotes convolution and $$\alpha_{i,j,l,m}(\hat{X}) = \frac{1}{D_{i,j}(\hat{X})} + \frac{1}{D_{l,m}(\hat{X})}.$$

The $\alpha_{i,j,l,m}$ may comprise data-adaptive weights for the local neighbors in S. Alternative embodiments may comprise iterative update according to minimization using optimized steepest descent, conjugate gradient and other minimization methods.

Alternative embodiments of the present invention may comprise methods and systems for removing the effect of the blur described by $H_{PSF}$ from a re-sampled image, $Y_{resampled}$, formed from multiple low-resolution images captured with multiple different exposure times. In these embodiments, a re-sampled image may be formed according to:

$$Y_{resampled} = \sum_{i=1,\ldots,I} \tau_i M_i^{-1} D_i^{-1} Y_i,$$

where $\tau_i$ may be based on the exposure time of the ith captured low-resolution image and the maximum exposure time among all images, i=1, . . . , I.

In some embodiments, associated with a re-sampled image, $Y_{resampled}$, a diagonal weight matrix, which may be denoted W, may be defined, wherein entries W (i, j) on the diagonal may be equal to the reliability of pixel (i, j) in the re-sampled image, $Y_{resampled}$. In some embodiments, reliability values may be between 0.0 and 1.0, wherein values closer to 0.0 may indicate data samples with lower reliability than those with values closer to 1.0. In alternative embodiments, other values may be used. In some embodiments, pixels with saturated value, or value close to saturation, may be considered unreliable and may be assigned a reliability value close to 0.0.

Figure 2:
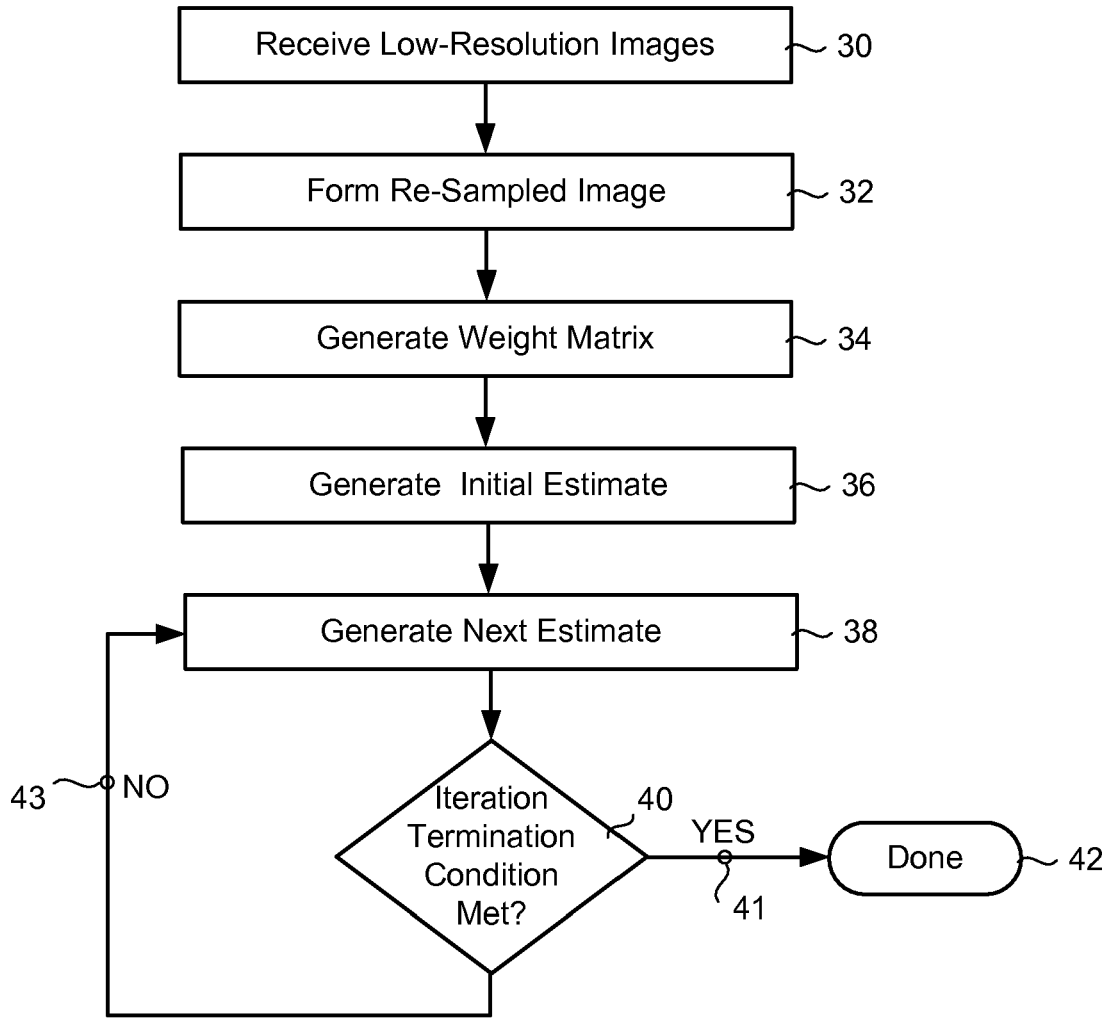
FIG. 2 is a chart showing exemplary embodiments of the present invention comprising forming a re-sampled image from one or more low-resolution images, generating a weight matrix based on the re-sampled image pixel reliability, and iteratively estimating a de-blurred image.

A cost function comprising dynamic-range expansion may be given as follows for some embodiments:

$$\Phi(X)=(Y_{resampled}-H_{PSF}X)^T W(Y_{resampled}-H_{PSF}X)+\lambda C(X).$$

where W may be the weight matrix comprising the reliability values. Using steepest-descent-based minimization and the TV constraint, some embodiments may comprise an iterative update according to:

$$\hat{X}^{k+1}(i,j) = \hat{X}^k(i,j) - $$
$$\beta\left[H_{PSF}^T(-i,-j)*\left(W(i,j)(H_{PSF}(i,j)*\hat{X}^k(i,j) - Y_{resampled}(i,j))\right) - \right.$$
$$\left. 0.5\beta\lambda\left[\sum_{l,m\in S} \alpha_{i,j,l,m}(\hat{X}^k)(\hat{X}^k(i,j) - \hat{X}^k(i+l,j+m))\right]\right],$$

where * denotes convolution, and the re-sampled image may be based on the exposure times of the low-resolution images and the cost function may comprise the weight matrix. These embodiments may be described in relation to FIG. 2 and FIG. 3. Multiple low-resolution images may be received 30 and a re-sampled image may be formed 32 from the low-resolution images. The re-sampled image may be formed 32 according to:

$$Y_{resampled} = \sum_{i=1,\ldots,I} \tau_i M_i^{-1} D_i^{-1} Y_i$$

as described above. A weight matrix may be generated 34 based on the re-sampled image, and an initial estimate of the de-blurred image may be formed 36. In some embodiments, the initial estimate may be based on the re-sampled image. An updated estimate may be generated 38 using a TV constraint and minimization procedure. An iteration-termination condition may be examined 40, and if the condition is met 41, the iteration process may terminate 42. If the condition is not met 43, then a new estimate maybe generated 38.

Figure 3:
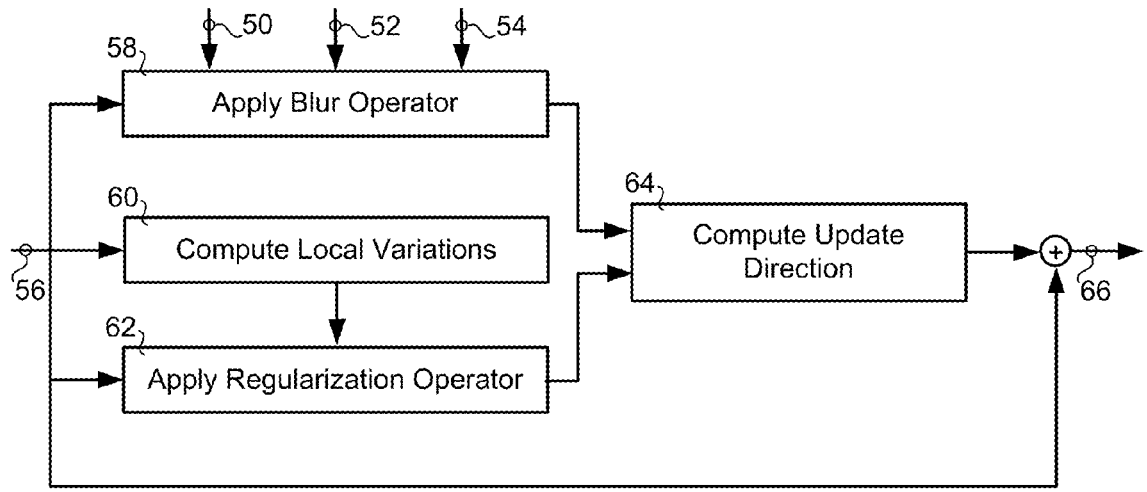
FIG. 3 is a chart showing exemplary embodiments of the present invention comprising de-blurring using local variations and regularization.

FIG. 3 describes one iteration according to exemplary embodiments of the present invention comprising a TV constraint and reliability weight matrix. The blur operator may be applied 58 using the known point-spread-function 54, $H_{PSF}$, the re-sampled image 52, $Y_{resampled}$, the weight matrix 50, W, and the current estimate 56, $\hat{X}^k$. The local variations may be computed 60 using the current estimate 56, and the regularization operator may be applied 62 using the computed 60 local variations and the current estimate 56. An update direction may be computed 64 using the results of the blur operation and the regularization operation, and the current estimate 56 may be updated generating a new, current estimate 66.

One of the main concerns during de-blurring may be the potential for noise amplification. Noise may be inherently present in captured image data and ignoring noise during de-blurring may render a resulting high-resolution image less useful. The use of regularizing, or stabilizing, constraints during de-blurring may be one way to control or suppress the noise in the data and prevent its amplification. The Total Variation constraint may be effective in controlling the noise. However, this constraint, similar to most regularizing constraints, acts locally and has the potential to re-introduce a small amount of blur. The strength of the constraint may be selected appropriately to balance the dangers of noise amplification and blurring.

Figure 4:
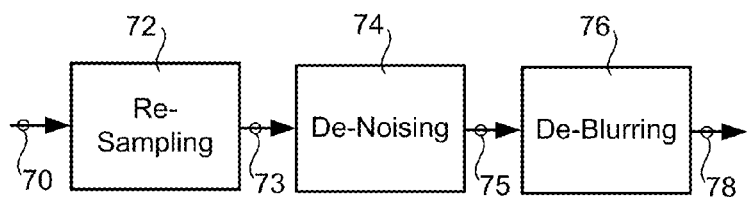
FIG. 4 is a chart showing exemplary embodiments of the present invention comprising de-noising prior to de-blurring.

Some embodiments of the present invention described in relation to FIG. 4 may comprise, prior to de-blurring 76, de-noising 74 of a re-sampled image 73 formed by combining 72 multiple low-resolution images 70. The de-noised image 75 may be de-blurred 76 to form the final estimate 78 of the high-resolution image. Some embodiments of the present invention may comprise de-noising methods known in the art applied prior to the de-blurring methods and systems above-described herein. Alternative embodiments of the present invention may comprise de-noising according to systems and methods of the present invention described below.

Some embodiments of the present invention comprise methods and systems for de-noising and noise suppression which may allow improved de-noising capability with a decreased potential for re-introducing blur. Some of these embodiments may comprise non-local means.

Figure 5:
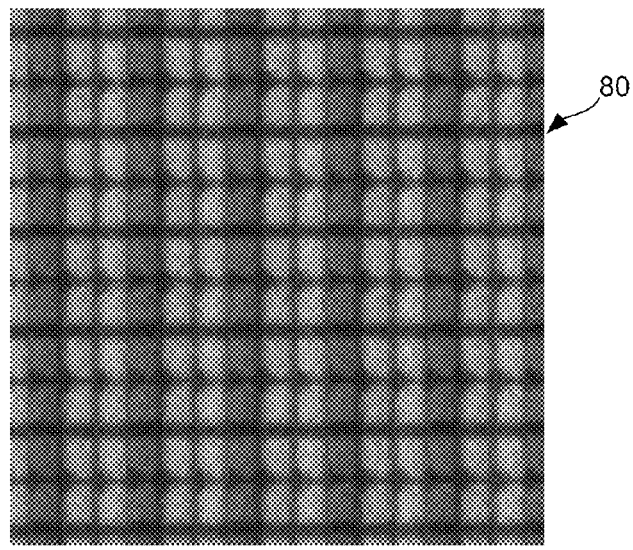
FIG. 5 is a picture depicting an exemplary image exhibiting spatially repetitive patterns.
Figure 6:
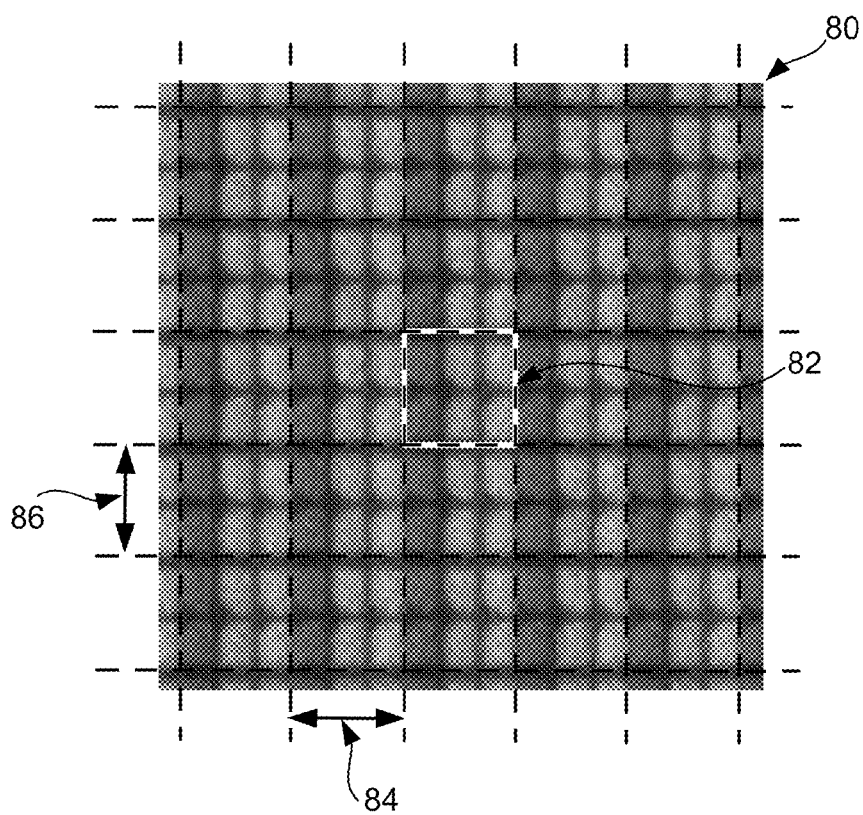
FIG. 6 is a picture illustrating a repetitive pattern and the horizontal and vertical period of the repetition.

Some embodiments of the present invention may make use of prior knowledge about repetitive patterns in image data to restrict a non-local means determination. One exemplary scenario wherein the image data exhibits repetitive patterns may be captured images of an LCD (Liquid Crystal Display) panel, where the LCD panel itself may be controlled to display a particular test pattern. The resulting images may contain an array of LCD pixels and sub-pixels. The pattern of LCD pixels visible in an image may be very regular due to tight control over the setup of the camera and LCD panel. An example of such an image 80 is shown in FIG. 5. The image may show a pattern of LCD pixels that may be repeated horizontally and vertically, with a constant period between one pattern and the next, as illustrated in FIG. 6 for the exemplary image 80 shown in FIG. 5. The image 80 comprises a pattern 82 that may repeat with a horizontal period 84, which may be denoted $l_x$, and a vertical period 86, which may be denoted $l_y$. In some embodiments of the present invention, at each pixel in the image, pixels in different areas of the image that are highly similar, and therefore represent excellent candidates for de-noising purposes, may be located.

Some images may comprise small bright or dark irregularities, which may correspond to pixel defects in an LCD panel. These (sub)pixel defects are exceptions in the regular pattern and must be preserved during de-noising. Regular de-noising techniques have a potential to weaken the visibility of these LCD panel defects. Some embodiments of the present invention comprise data-adaptive weights that may avoid this problem.

Embodiments of the present invention may not introduce additional blur, and hence may have an advantage over many existing de-noising techniques. Performing de-noising according to embodiments of the present invention before de-blurring may allow the reduction of the strength of the regularization constraint during de-blurring, since the power of the noise will have been reduced. This may reduce the risk of blur due to regularization, and also may reduce the risk of other artifacts that may occur in some cases when regularization may be applied.

Some embodiments of the present invention comprise non-iterative methods and systems for de-noising an image. Some of these embodiments may comprise weighted averaging using non-local neighbor pixels and data adaptive weights. In these embodiments, an image may be processed pixel-by-pixel, and the pixel considered for processing, for example, the pixel at location (i, j), may be considered the center pixel. A neighbor index set $N \triangleq \{ \ldots, -3, -2, -1, 0, 1, 2, 3, \ldots \}$, where 0 may refer to the center pixel being processed and other index values refer to neighboring pixels that may be used in the de-noising process, may be defined. A patch of pixels around the center pixel, and likewise around the neighboring pixels, may be defined. The patch size may be defined to be $(2A+1) \times (2B+1)$ pixels. Alternative patch sizes may be used. The neighbor index set N may also refer to neighboring patches in addition to neighboring pixels.

Figure 7:
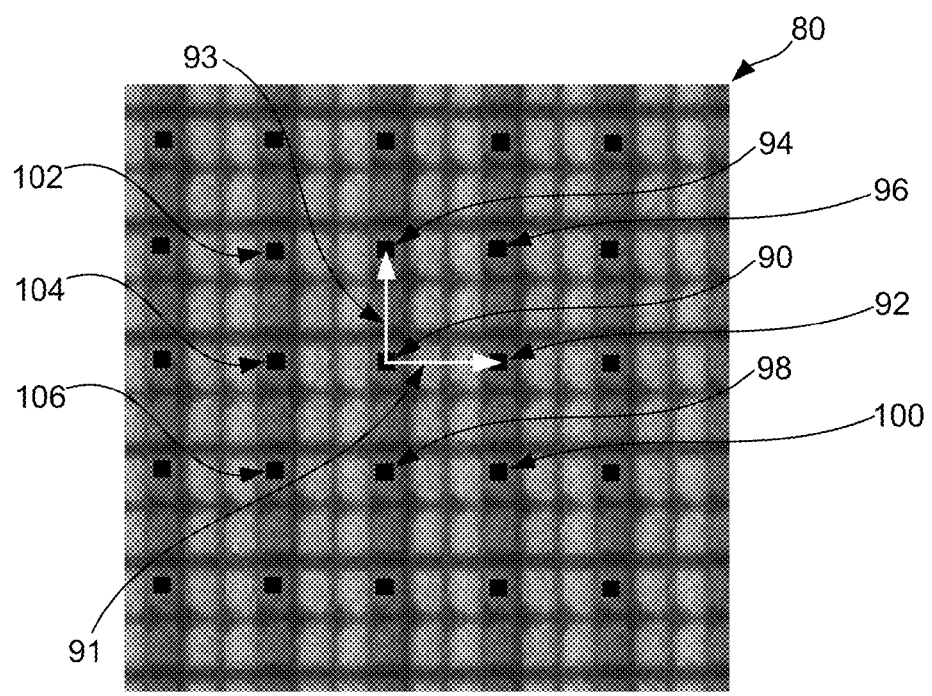
FIG. 7 is a picture illustrating neighboring pixels associated with a center pixel.

The nth neighboring pixel may be offset vertically by $L_n$ pixels and horizontally by $M_n$ pixels in the image. In some embodiments of the present invention, these offsets may be defined using one direction vector. In alternative embodiments of the present invention, these offsets may be defined using two direction vectors. In some embodiments, using one or two direction vectors may depend on whether the pattern repeats along only one direction or along two directions in the image plane. A first direction vector may be defined as $r=[r_x, r_y]^T$, and a second direction vector may be defined as $s=[s_x, s_y]^T$. For the exemplary image 80 shown in FIG. 5 and FIG. 6, these direction vectors may be defined as $r=[1_x, 0]^T$ 91 and $s=[0, 1_y]^T$ 93 as illustrated in FIG. 7 relative to a center pixel 90. The offsets for neighboring pixels may be defined as linear integer combinations of the direction vectors according to:

$$[M_n, L_n]^T = p_n s + q_n r$$

where $p_n$ and $q_n$ are integers. Thus, the horizontal and vertical offsets may be determined according to $M_n = p_n s_x + q_n r_x$ and $L_n = p_n s_y + q_n r_y$, respectively. For example, the eight-nearest neighboring offset pixels may be determined using:

$$(p_n, q_n) \in \{(-1,-1), (0,-1), (1,-1), (-1,0), (0,0), (1,0), (-1,1), (0,1), (1,1)\}.$$

FIG. 7 illustrates a center pixel 90 and the eight nearest neighboring offset pixels 92, 94, 96, 98, 100, 102, 104, 106 corresponding to $(p_n, q_n) = (0,1), (1,0), (1,1), (-1,0), (-1,1), (1,-1), (0,-1)$ and $(-1,-1)$, respectively.

In some embodiment of the present invention, neighbors may be restricted to pixels that are located on a regular lattice defined by one or two direction vectors. Only one direction vector may be needed if the image pattern repeats only in one direction.

A de-noising weight for the nth neighboring pixel of the pixel located at (i,j), also considered the center pixel, may be determined, in some embodiments of the present invention, according to:

$$w_{i,j,n}(Y_{resampled}) = \exp\left\{-\frac{1}{h^2} \sum_{u=-A}^{A} \sum_{v=-B}^{B} [Y_{resampled}(i+u, j+v) - Y_{resampled}(i+u+L_n, j+v+M_n)]^2\right\},$$

where h may be a parameter associated with the de-noising strength, wherein a larger value of h may correspond to a higher de-noising strength. In these embodiments, the de-noising weights may be based on the pixel differences between corresponding pixels in the center patch and a neighboring patch. Alternative embodiments of the present invention may use alternative function forms to the exponential function, exp. In some embodiments of the present invention, the weights may be determined using a mathematical formulation. In alternative embodiments of the present invention, a pre-computed mapping, for example, a lookup-table, may be used to determine the weights.

Figure 8:
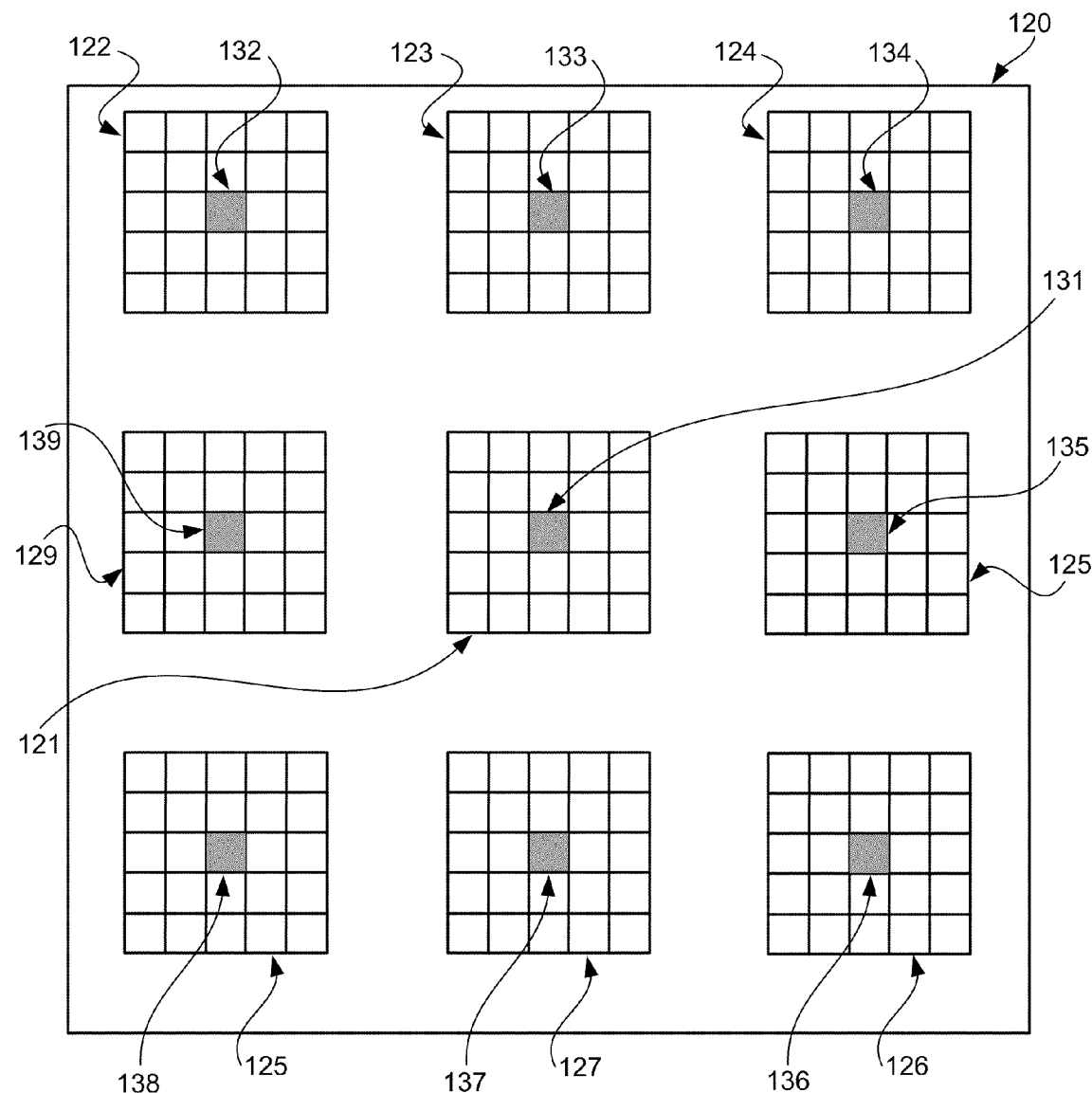
FIG. 8 is a picture illustrating neighboring pixels and associated pixel patches associated with a center pixel.

FIG. 8 illustrates an exemplary image 120. An exemplary center pixel 131 and a patch 121 of pixels associated with the center pixel 131 are shown in FIG. 8. Eight neighboring pixels 132-139 and associated patches 122-129 are also shown.

Figure 9:
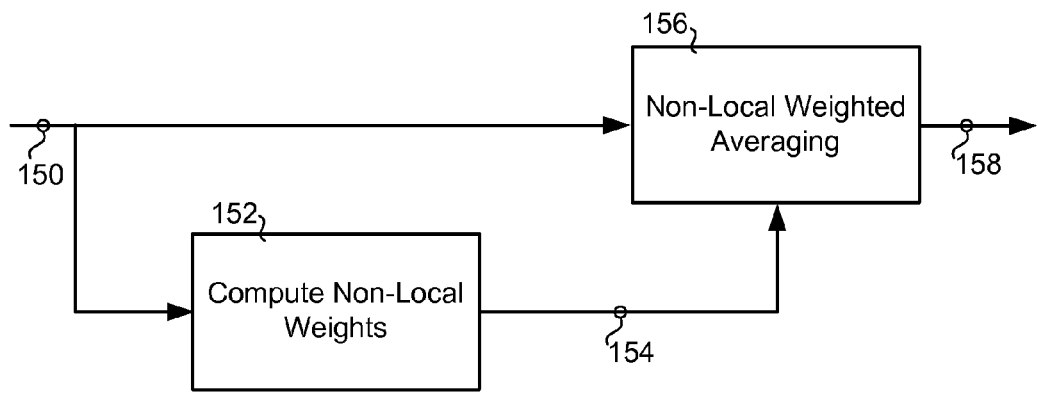
FIG. 9 is a chart showing exemplary embodiments of the present invention comprising determination of non-local weights and a non-local weighted averaging of an input image.

Some embodiments of the present invention may be described in relation to FIG. 9. Non-local weights 154 may be computed 152 from an input image 150. The non-local weights 154 may be used in a non-local weighted averaging 156 of the input image 150 to form a de-noised version 158 of the input image. In some embodiments of the present invention, the input image 150 may comprise a re-sampled image formed from multiple, low-resolution images.

In some embodiments of the present invention, weights may be determined for the neighboring pixels associated with a center pixel, and a de-noised value associated with the center pixel may be determined according to:

$$\hat{X}_{denoised}(i, j) = \frac{1}{\sum_{n \in N} w_{i,j,n}(Y_{resampled})} \sum_{n \in N} w_{i,j,n}(Y_{resampled}) Y_{resampled}(i+L_n, j+M_n).$$

Some embodiments of the present invention comprise iterative de-noising using non-local neighbor pixels and data-adaptive weights. In these embodiments, the weights may be determined at each iteration using the current estimate of the de-noised image according to:

$$w_{i,j,n}(\hat{X}^k) = \exp\left\{-\frac{1}{h^2} \sum_{u=-A}^{A} \sum_{v=-B}^{B} [\hat{X}^k(i+u, j+v) - \hat{X}^k(i+u+L_n, j+v+M_n)]^2\right\},$$

and an updated de-noised estimate may be generated from the current weight estimates and the re-sampled image according to:

$$\hat{X}^{k+1}(i, j) = \hat{X}^k(i, j) -$$

$$\beta \left[ \frac{1}{\sum_{n \in N} w_{i,j,n}(\hat{X}^k)} \sum_{n \in N} w_{i,j,n}(\hat{X}^k) Y_{resampled}(i+L_n, j+M_n) \right].$$

In these embodiments, the de-nosing weights may be continuously improved as the iterations progress.

In some embodiments of the present invention, the initial estimate, $\hat{X}^0$, may be based directly on the re-sampled image. In some of these embodiments, the initial estimate may be determined according to:

$$\hat{X}^0 = Y_{resampled}.$$

Figure 10:
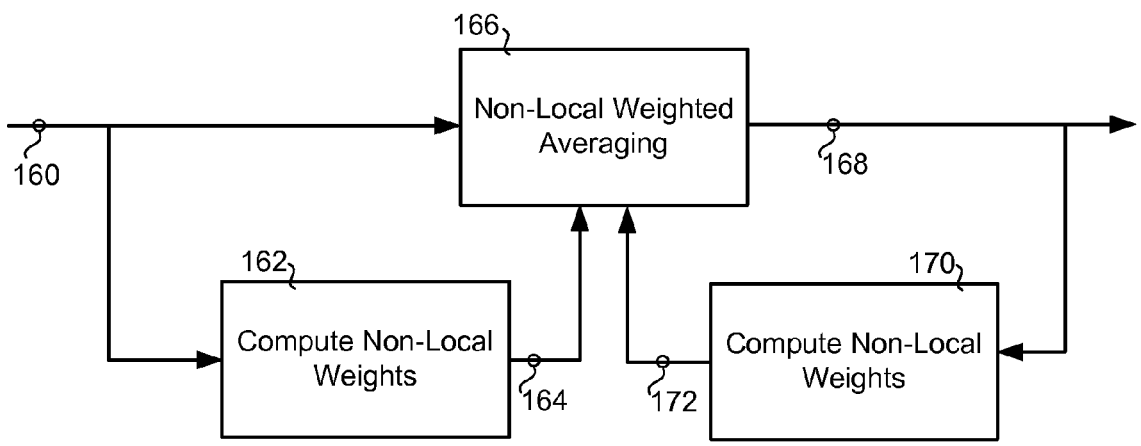
FIG. 10 is a chart showing exemplary embodiments of the present invention comprising determination of non-local weights which may progressively improve with iterative estimation of a de-noised image.

Some embodiments of the present invention may be described in relation to FIG. 10. In these embodiments, non-local weights 164 may be calculated 162 from a re-sampled image 160 to generate a first de-noised image estimate 168 using non-local weighted averaging 166 of the re-sampled image 160. In subsequent iterations, non-local weights 172 may be computed 170 from the current de-noised image estimate 168. The non-local weights 172 based on the current de-noised image estimate and the re-sampled image 160 may be used to form a new, de-noised image estimate 168 using non-local weighted averaging 166 of the re-sampled image 160.

During the first iteration, the de-noising weights may be computed from the input image 160; however, during subsequent iterations, the de-noising weights may be computed on the output of the previous iteration 168. The de-noising weights may be, thus, iteratively improved.

The above-described iterative de-noising scheme may be derived indirectly by introducing a cost function that may be subsequently minimized with a gradient descent method. The cost function may be defined:

$$\Gamma(\hat{X}) = \sum_{i,j} \quad (19)$$

$$\left[ \hat{X}(i, j) - \frac{1}{\sum_{n \in N} w_{i,j,n}(\hat{X})} \sum_{n \in N} w_{i,j,n}(\hat{X}) Y_{resampled}(i+L_n, j+M_n) \right]^2,$$

with de-noising weights $w_{i,j,n}(\hat{X})$ defined:

$$w_{i,j,n}(\hat{X}) =$$

$$\exp\left\{ -\frac{1}{h^2} \sum_{u=-A}^{A} \sum_{v=-B}^{B} \left[ \hat{X}(i+u, j+v) - \hat{X}(i+u+L_n, j+v+M_n) \right]^2 \right\}.$$

An iterative gradient descent algorithm for de-noising may be constructed by determining the gradient, also considered the derivative, of $\Gamma(\hat{X})$ with respect to $\hat{X}$.

An alternative cost function may be defined:

$$\Gamma(\hat{X}) =$$

$$\sum_{i,j} \frac{1}{\sum_{n \in N} w_{i,j,n}(\hat{X})} \sum_{n \in N} w_{i,j,n}(\hat{X}) [\hat{X}(i, j) - Y_{resampled}(i+L_n, j+M_n)]^2,$$

yielding, through gradient determination, an iterative gradient descent algorithm for de-noising.

A de-noised estimate may still contain blur, and may be subsequently de-blurred. In some embodiments, the de-blurring may comprise methods known in the art. In alternative embodiments, the de-blurring may comprise de-blurring according to embodiments of the present invention described herein using cost-function minimization and regularization.

Some embodiments of the present invention comprise methods and systems for removing blur using a non-local regularization constraint based on repetitive patterns in a high-resolution image associated with multiple, low-resolution observations. Some embodiments of the present invention comprising a non-local regularization constraint may provide improved noise suppression. Compared to systems using separate de-noising prior to de-blurring, some embodiments of the present invention comprising a non-local regularization constraint may provide lower computation cost.

An estimate, which may be denoted $\hat{X}$, of an ideal, high-resolution image may be computed by minimization of a cost function formulated as follows to achieve simultaneous de-blurring and de-noising:

$$\hat{X} = \operatorname{argmin}[\|Y_{resampled} - H_{PSF}\hat{X}\|^2 + \lambda \Gamma(\hat{X})],$$

where $$\Gamma(\hat{X}) = \sum_{i,j} \left[ \hat{X}(i, j) - \frac{1}{\sum_{n \in N} w_{i,j,n}(\hat{X})} \sum_{n \in N} w_{i,j,n}(\hat{X}) \hat{X}(i+L_n, j+M_n) \right]^2$$

and $w_{i,j,n}(\hat{X})$ may be data-adaptive de-noising weights, based on the similarity between a center-pixel patch and non-local neighboring patches, given by:

$$w_{i,j,n}(\hat{X}) =$$

$$\exp\left\{ -\frac{1}{h^2} \sum_{u=-A}^{A} \sum_{v=-B}^{B} \left[ \hat{X}(i+u, j+v) - \hat{X}(i+u+L_n, j+v+M_n) \right]^2 \right\}.$$

An iterative update equation for minimizing the cost function may be determined using gradient descent. In some embodiments of the present invention, the iterative update may be made according to:

$$\hat{X}^{k+1}(i, j) =$$

$$\hat{X}^k(i, j) - \beta [H_{PSF}^T(-i, -j) * (H_{PSF}(i, j) * \hat{X}^k(i, j) - Y_{resampled}(i, j))] -$$

$$\beta\lambda \left[ \hat{X}^k(i, j) - \frac{1}{\sum_{n \in N} w_{i,j,n}(\hat{X}^k)} \sum_{n \in N} w_{i,j,n}(\hat{X}^k) \hat{X}^k(i+L_n, j+M_n) \right]$$

where * denotes convolution.

Figure 11:
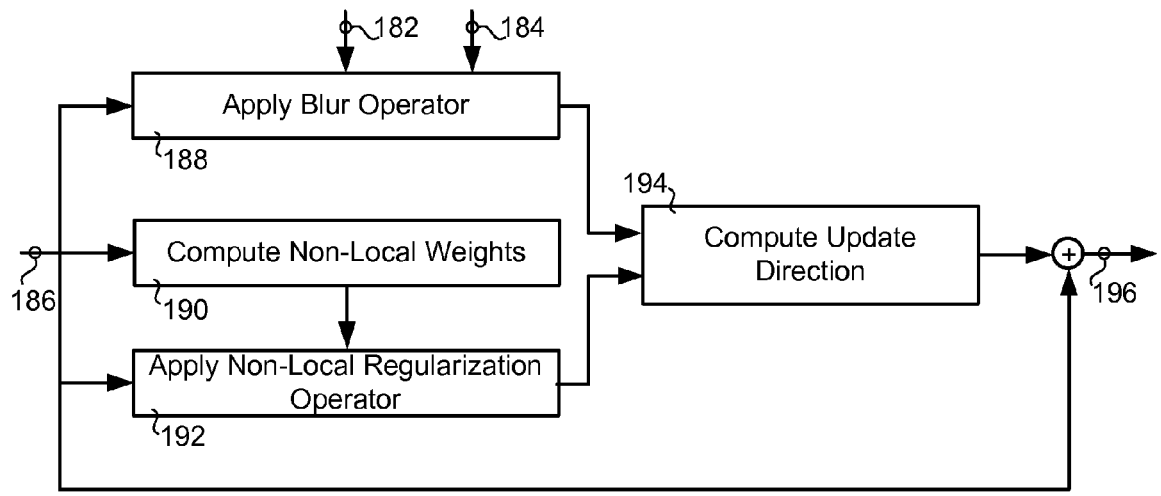
FIG. 11 is a chart showing exemplary embodiments of the present invention comprising non-local regularization constraints.

FIG. 11 describes one iteration according to exemplary embodiments of the present invention comprising a non-local regularization constraint based on repetitive patterns in a high-resolution image associated with multiple, low-resolution observations. A blur operator may be applied 188 using a known point-spread-function 184, $H_{PSF}$, the re-sampled image 182, $Y_{resampled}$, and the current estimate 186, $\hat{X}^k$. Non-local weights may be computed 190 using the current estimate 186, and a non-local regularization operator may be applied 192 using the computed 190 non-local weights and the current estimate 186. An update direction may be computed 194 using the result of the blur operation and the regularization operation, and the current estimate 186 may be updated generating a new, current estimate 196.

In some embodiments of the present invention, a re-sampled image, $Y_{resampled}$, may be formed from multiple low-resolution images captured with multiple different exposure times. In these embodiments, the re-sampled image may be determined according to:

$$Y_{resampled} = \sum_{i=1,\ldots,I} \tau_i M_i^{-1} D_i^{-1} Y_i,$$

where $\tau_i$ may be based on the exposure time of the ith captured low-resolution image and the maximum exposure time among all images, $i=1, \ldots, I$.

In some embodiments, associated with a re-sampled image, $Y_{resampled}$, a diagonal weight matrix, which may be denoted W, may be defined, wherein entries W (i, j) on the diagonal may be equal to the reliability of pixel (i, j) in the re-sampled image, $Y_{resampled}$. In some embodiments, reliability values may be between 0.0 and 1.0, wherein values closer to 0.0 may indicate data samples with lower reliability than those with values closer to 1.0. In alternative embodiments, other values may be used. In some embodiments, pixels with saturated value, or value close to saturation, may be considered unreliable and be assigned a reliability value close to 0.0.

An estimate, which may be denoted $\hat{X}$, of an ideal, high-resolution image may be computed by minimization of a cost function formulated to achieve simultaneous de-blurring and de-noising and accounting for dynamic-range expansion may be given as follows for some embodiments:

$$\hat{X} = \operatorname{argmin}\left[(Y_{resampled} - H_{PSF} X)^T W (Y_{resampled} - H_{PSF} X) + \lambda \Gamma(\hat{X})\right],$$

where $$\Gamma(\hat{X}) = \sum_{i,j} \left[\hat{X}(i, j) - \frac{1}{\sum_{n \in N} w_{i,j,n}(\hat{X})} \sum_{n \in N} w_{i,j,n}(\hat{X}) \hat{X}(i + L_n, j + M_n)\right]^2$$

and $w_{i,j,n}(\hat{X})$ may be data-adaptive de-noising weights, based on the similarity between a center-pixel patch and non-local neighboring patches, given by:

$$w_{i,j,n}(\hat{X}) =$$

$$\exp\left\{-\frac{1}{h^2} \sum_{u=-A}^{A} \sum_{v=-B}^{B} \left[\hat{X}(i+u, j+v) - \hat{X}(i+u+L_n, j+v+M_n)\right]^2\right\}.$$

An iterative update equation for minimizing the cost function may be determined using gradient descent. The iterative update in some embodiments of the present invention may be made according to:

$$\hat{X}^{k+1}(i, j) = \hat{X}^k(i, j) -$$

$$\beta\left[H_{PSF}^T(-i, -j) * \left(W(i, j)(H_{PSF}(i, j) * \hat{X}^k(i, j) - Y_{resampled}(i, j))\right)\right] -$$

-continued $$\beta\lambda\left[\hat{X}^k(i, j) - \frac{1}{\sum_{n \in N} w_{i,j,n}(\hat{X}^k)} \sum_{n \in N} w_{i,j,n}(\hat{X}^k) \hat{X}^k(i + L_n, j + M_n)\right]$$

where * denotes convolution and W (i, j) denotes the reliability weight.

Figure 12:
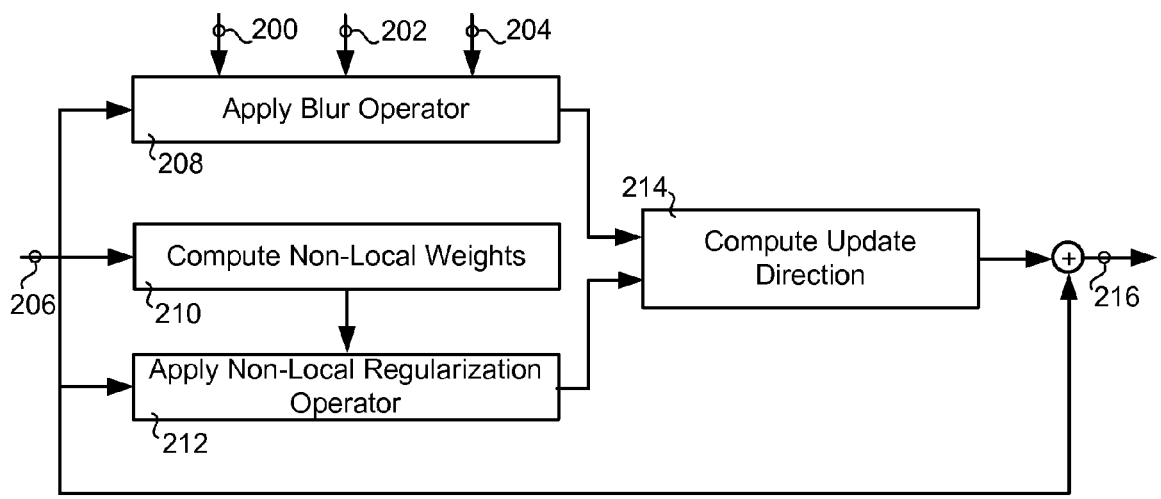
FIG. 12 is a chart showing exemplary embodiments of the present invention comprising non-local regularization constraints and dynamic range expansion.

FIG. 12 describes one iteration according to some embodiments of the present invention comprising a non-local regularization constraint based on repetitive patterns in a high-resolution image associated with multiple, low-resolution observations comprising differing exposure times. A blur operator may be applied 208 using a known point-spread-function 204, $H_{PSF}$, the re-sampled image 202, $Y_{resampled}$, the reliability weights 200, W, and the current estimate 206, $\hat{X}^k$. Non-local weights may be computed 210 using the current estimate 206, and a non-local regularization operator may be applied 212 using the computed 210 non-local weights and the current estimate 206. An update direction may be computed 214 using the result of the blur operation and the regularization operation, and the current estimate 206 may be updated generating a new, current estimate 216.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for forming an image, said method comprising:
    associated with a first image, determining a pattern-repetition direction vector comprising a horizontal component and a vertical component;
    for a first pixel in a reconstructed image, determining a first plurality of weights associated with a first plurality of pixels in said reconstructed image, wherein
        each pixel in said first plurality of pixels is located an associated integral number of horizontal-component pixel values from said first pixel in the horizontal direction and an associated number of vertical-component pixel values from said first pixel in the vertical direction;
        each pixel in said first plurality of pixels comprises an associated pixel value; and
        said weights are determined using said reconstructed image; and
    updating a first pixel value associated with said first pixel in said reconstructed image based on the value of a pixel in said first image at a location associated with said first pixel in said reconstructed image and a combination of said associated pixel values of said first plurality of pixels using said first plurality of weights, wherein said determining a pattern-repetition direction vector, said determining a first plurality of weights and said updating are performed by a computing device.

2. A method as described in claim 1, wherein:
    said first image is produced by combining a second image and a third image; and
    said first image has a first-image spatial resolution greater than a second-image spatial resolution associated with said second image and a third-image spatial resolution associated with said third image.

3. A method as described in claim 2, wherein said second-image spatial resolution and said third-image spatial resolution are approximately equal.

4. A method as described in claim 2, wherein said combining a second image and a third image comprises:
- a first inverse motion operator associated with said second image;
- a second inverse motion operator associated with said third image;
- a first inverse down-sampling operator associated with said second image; and
- a second inverse down-sampling operator associated with said third image.

5. A method as described in claim 2 further comprising:
associating a reliability value with the value of said pixel in said first image at said location associated with said first pixel location in said reconstructed image; and
wherein:
said combining a second image and a third image is based on a first exposure time associated with said second image and a second exposure time associated with said third image; and
said updating is further based on said reliability value.

6. A method as described in claim 1 further comprising initializing said reconstructed image to said first image.

7. A method as described in claim 1, wherein said determining a first plurality of weights comprises, for a second pixel in said first plurality of pixels and said first pixel, calculating the pixel-value differences between corresponding pixels in a first neighborhood proximate to said first pixel and a corresponding second neighborhood proximate to said second pixel.

8. A method as described in claim 7 further comprising:
squaring said differences;
summing said squared differences;
adjusting said summed, squared difference according to a first parameter; and
exponentiating the adjusted, summed, squared difference.

9. A method for forming an image, said method comprising:
producing a combined image by combining a first image and a second image using a first exposure time associated with said first image and a second exposure time associated with said second image, wherein said combined image has a combined-image spatial resolution greater than a first spatial resolution associated with said first image and a second spatial resolution associated with said second image;
associating a reliability value with a first pixel in said combined image; and
updating a first pixel value in a reconstructed image at a location corresponding to said first pixel in said combined image based on said reliability value, a value associated with said first pixel in said combined image and a local variation measure of said reconstructed image in a region proximate to said location, wherein said combining, said associating and said updating are performed by a computing device.

10. A method as described in claim 9, wherein said first spatial resolution and said second spatial resolution are approximately equal.

11. A method as described in claim 9, wherein said region comprises a four-connected neighborhood.

12. A method as described in claim 9, wherein said combining comprises:
- a first inverse motion operator associated with said first image;
- a second inverse motion operator associated with said second image;
- a first inverse down-sampling operator associated with said first image; and
- a second inverse down-sampling operator associated with said second image.

13. A method as described in claim 9, wherein said updating comprises minimization of a first cost function comprising a first constraint based on a total variation norm.

14. A method for forming an image, said method comprising:
associated with a first image, determining a pattern-repetition direction vector comprising a horizontal component and a vertical component;
for a first pixel in said first image, determining a first plurality of weights associated with a first plurality of pixels in said first image, wherein each pixel in said first plurality of pixels is located an associated integral number of horizontal-component pixel values from said first pixel in the horizontal direction and an associated number of vertical-component pixel values from said first pixel in the vertical direction and comprises an associated pixel value; and
determining a first de-noised pixel value in a de-noised image at a location associated with said first pixel in said first image by combining said associated pixel values of said first plurality of pixels using said first plurality of weights, wherein said determining a pattern-repetition direction vector, said determining a first plurality of weights and said determining a first de-noised pixel value are performed by a computing device.

15. A method as described in claim 14, wherein:
said first image is produced by combining a second image and a third image; and
said first image has a first-image spatial resolution greater than a second-image spatial resolution associated with said second image and a third-image spatial resolution associated with said third image.

16. A method as described in claim 15, wherein said combining a second image and a third image comprises using a first exposure time associated with said second image and a second exposure time associated with said third image.

17. A method as described in claim 15, wherein said second-image spatial resolution and said third-image spatial resolution are approximately equal.

18. A method as described in claim 15, wherein said combining comprises:
- a first inverse motion operator associated with said second image;
- a second inverse motion operator associated with said third image;
- a first inverse down-sampling operator associated with said second image; and
- a second inverse down-sampling operator associated with said third image.

19. A method as described in claim 14, wherein said determining a first plurality of weights comprises, for a second pixel in said first plurality of pixels and said first pixel, calculating the pixel-value differences between corresponding pixels in a first neighborhood proximate to said first pixel and a corresponding second neighborhood proximate to said second pixel.

20. A method as described in claim 19 further comprising:
squaring said differences;
summing said squared differences;
adjusting said summed, squared difference according to a first parameter; and exponentiating the adjusted, summed, squared difference.

21. A method as described in claim 14, further comprising:
associating a reliability value with said first de-noised pixel; and
updating a first pixel value in a reconstructed image at a location corresponding to said first de-noised pixel in said de-noised image based on said reliability value, a value associated with said first de-noised pixel in said de-noised image and a local variation measure of said reconstructed image in a region proximate to said location corresponding to said first de-noised pixel.

22. A method for forming an image, said method comprising:
associated with a first image, determining a pattern-repetition direction vector comprising a horizontal component and a vertical component;
for a first pixel in said first image, determining a first plurality of weights associated with a first plurality of pixels in said first image, wherein
   each pixel in said first plurality of pixels is located an associated integral number of horizontal-component pixel values from said first pixel in the horizontal direction and an associated number of vertical-component pixel values from said first pixel in the vertical direction;
   each pixel in said first plurality of pixels comprises an associated pixel value; and
   said weights are determined using a de-noised image associated with said first image; and
updating a first de-noised pixel value at a location in said de-noised image corresponding to said first pixel in said first image by combining said associated pixel values of said first plurality of pixels using said first plurality of weights, wherein said determining a pattern-repetition direction vector, said determining a first plurality of weights and said updating are performed by a computing device.

23. A method as described in claim 22 further comprising initializing said de-noised image to said first image.

24. A method as described in claim 22, wherein said determining a first plurality of weights comprises, for second pixel in said de-noised image corresponding to a second pixel location in said first image from said first plurality of pixels and for a first pixel location in said de-noised image corresponding to said first pixel in said first image, calculating the pixel-value differences between corresponding pixels in a first neighborhood proximate to said first pixel location in said de-noised image and a corresponding second neighborhood proximate to said second pixel location in said de-noised image.

25. A method as described in claim 24 further comprising:
squaring said differences;
summing said squared differences;
adjusting said summed, squared difference according to a first parameter; and
exponentiating the adjusted, summed, squared difference.

26. A method as described in claim 22, wherein:
said first image is produced by combining a second image and a third image; and
said first image has a first-image spatial resolution greater than a second-image spatial resolution associated with said second image and a third-image spatial resolution associated with said third image.

27. A method as described in claim 26, wherein said combining a second image and a third image comprises using a first exposure time associated with said second image and a second exposure time associated with said third image.

28. A method as described in claim 26, wherein said second-image spatial resolution and said third-image spatial resolution are approximately equal.

29. A method as described in claim 26, wherein said combining comprises:
a first inverse motion operator associated with said second image;
a second inverse motion operator associated with said third image;
a first inverse down-sampling operator associated with said second image; and
a second inverse down-sampling operator associated with said third image.

30. A method as described in claim 22, further comprising:
associating a reliability value with said first de-noised pixel; and
updating a first pixel value in a reconstructed image at a location corresponding to said first de-noised pixel in said de-noised image based on said reliability value, a value associated with said first de-noised pixel in said de-noised image and a local variation measure of said reconstructed image in a region proximate to said location.

* * * * *